No. 712,500. Patented Nov. 4, 1902.
W. S. COLWELL.
LAWN MOWER.
(Application filed Apr. 19, 1902.)
(No Model.)
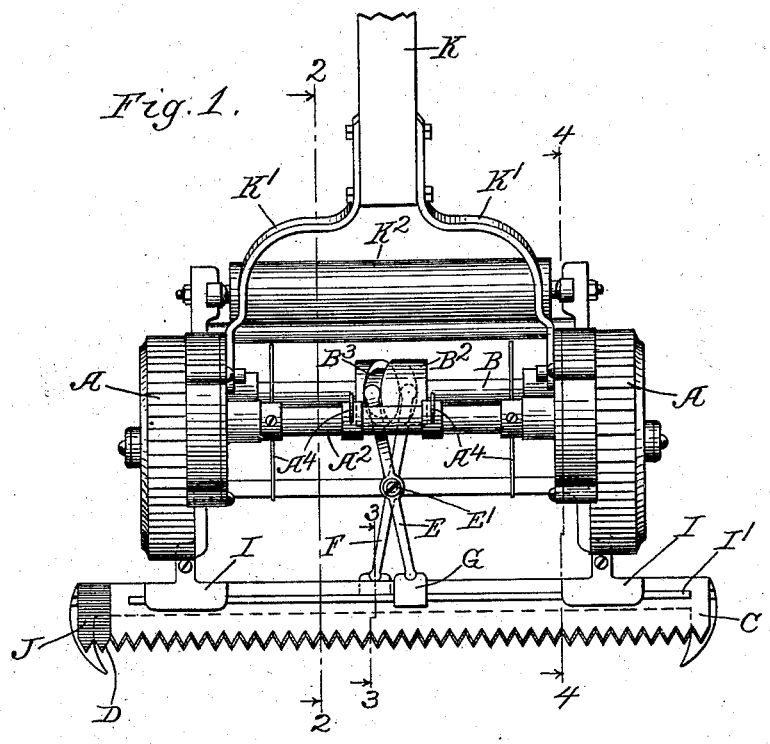
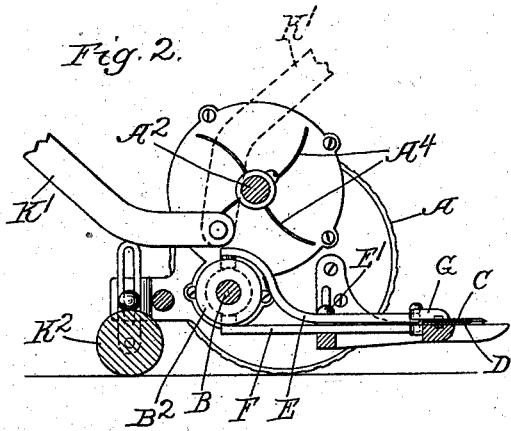
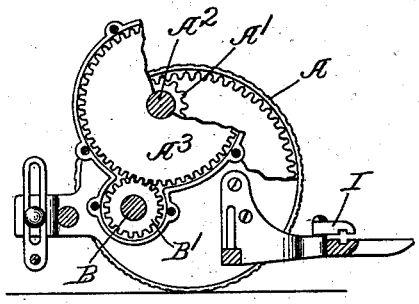
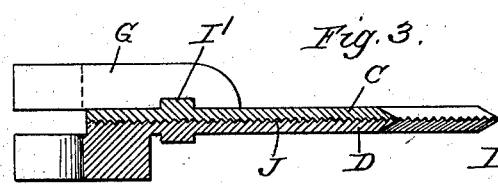
Witnesses.
Edward T. Wray.
Inventor.
William S. Colwell
by Parker Carter
Attorneys.

UNITED STATES PATENT OFFICE.

WILLIAM S. COLWELL, OF CHICAGO, ILLINOIS, ASSIGNOR TO ALEXANDER GRANT, OF CHICAGO, ILLINOIS.

LAWN-MOWER.

SPECIFICATION forming part of Letters Patent No. 712,500, dated November 4, 1902.

Application filed April 19, 1902. Serial No. 103,697. (No model.)

*To all whom it may concern:*

Be it known that I, WILLIAM S. COLWELL, a citizen of the United States, residing at Chicago, in the county of Cook and State of Illinois, have invented a certain new and useful Improvement in Lawn-Mowers, of which the following is a specification.

My invention relates to improvements in mowing-machines, particularly the type used for lawn-mowers, and has for its object to provide a new and improved machine of this description.

My invention is illustrated in the accompanying drawings, wherein—

Figure 1 is a plan view of a machine embodying my invention. Fig. 2 is a section on line 2 2, Fig. 1. Fig. 3 is a section on line 3 3, Fig. 1. Fig. 4 is a section, with parts omitted, on line 4 4, Fig. 1.

Like letters refer to like parts throughout the several figures.

As illustrated in the drawings, the mowing-machine is provided with the two supporting or driving wheels A. These driving-wheels connect in any desired manner with the driving-shaft B. This connection may, of course, be made in any manner desired. I have illustrated in the drawings a connection usually adopted for this purpose, wherein the driving-wheels A are provided with an internal gear, which gears are engaged by pinions A' on the shaft $A^2$, said shaft being connected by the gear $A^3$ with the pinions B' on the shaft B. This connection is so arranged that when the machine is pushed forward the shaft B is rotated and when pushed backward no rotation of said shaft will occur. Any of the usual constructions for this purpose may be used. As this construction is no part of my invention, I have not described it.

At the front of the machine I provide a sickle or cutter, consisting of two parts C and D, said parts being provided with teeth, as shown. Some suitable means is provided for moving these parts with relation to each other.

As herein shown, the driving-shaft B is provided with a cam $B^2$, provided with a suitable cam-slot $B^3$. Two connecting-arms E and F are provided with ends, which enter said cam-slot on opposite sides of the shaft, as illustrated in Fig. 2. These connecting-arms are pivoted at E' to a portion of the frame of the machine, and their outer ends are connected one to each of the cutter-bars C and D. This connection may be made in any desired manner. As herein shown, the cutter-bars are provided with the lugs or reinforcing-pieces G, provided with openings in which fit the rounded ends of the connecting-pieces E and F, thus permitting relative motion of the connecting-pieces and the cutter-bars. The cutter-bars, as will be seen, are located at the front of the machine and extend entirely thereacross, being preferably somewhat longer than the width of the machine, so that a wide swath may be cut. This construction also permits the machine to be run close to obstacles, and the grass around such obstacles may thus be easily cut.

The cutter-bars are mounted in suitable supports I, which may be of any desired construction. As shown in the drawings, each cutter-bar is provided with a projecting guide I', which engages a groove in the support I, thus permitting a free reciprocating motion of the cutter-bars. The supports I are preferably removably attached to the frame of the machine. The inner faces of the cutter-bars are provided with suitable projections J, which run longitudinally therealong, the projections being separated by suitable grooves. When the cutter-bars are in position, the projections of one fit into the grooves of the other. This permits the cutter-bars to be freely reciprocated, but prevents their displacement with relation to each other. These grooves and projections also extend along the teeth of the cutters and form the saw or sickle edges thereof, thus forming an engaging edge for the grass or material to be cut, which insures proper engagement and prevents the material from slipping by without being cut. It will be seen that by this construction the sickle edge is not affected by the wearing away of the teeth, for as the teeth are ground back the projections and grooves form this sickle edge throughout the life of the cutters.

I prefer to provide the shaft $A^2$ with suitable engaging fingers $A^4$, which are mounted so as to be rotated when the machine is in operation. These fingers engage the grass as it passes back of the sickle and throw it out behind, so as to be out of the way. The fingers are preferably bent or curved, as indicated, so as to avoid throwing the grass forward and insure its being properly taken care of.

The machine is provided with a suitable handle K, which is pivotally connected to the frame in any desired manner by means of the laterally-bent parts K'. A roller K² is attached at the rear of the machine, as shown. In case obstacles are encountered, such as hills or knolls, or if for any other reason it is desired to pull the machine instead of push it this may be done by swinging the handle forward. The operator may then pass around to the front of the machine and pull it toward him.

It is of course evident that the parts herein shown may be greatly varied in many particulars, and I have not attempted to show such variations. I have simply attempted to illustrate my device, so as to make its application clear.

The cutter-bars must of course be laterally moved; but I have shown a construction in which I move both of said bars positively and in the opposite direction. I do not, however, limit myself to this construction or to any of the other particular constructions illustrated.

The use and operation of my invention are as follows: In the ordinary use of the device to cut grass the operator grasps the handle and pushes the machine forward. The driving-wheels, because of engagement with the ground, are then rotated, and this rotation is then communicated to the shafts A² and B. The rotation of the shaft B causes the connecting-arms E and F to be rocked about their pivotal point, so as to reciprocate the cutter-bars in opposite directions. The grass or other material, therefore, which passes between the teeth of the cutter-bars is cut and falls back of the cutter. The arms A⁴ then engage this material and move it backward out of the way. Since the cutter is located at the front of the machine and is wider than such machine, it cuts all the material in front of the machine. This arrangement also facilitates the handling of the machine and permits the grass or other material in close proximity to fences and other obstacles to be easily and completely cut, for by the location of the cutter-bars the material is cut before the driving-wheels engage it. The serrated teeth or sickle edge on both of the cutters insure the proper engagement between the cutters and the material to be cut.

In the event it is desired to pull the machine forward instead of pushing it, the handle K may be moved about its pivotal connection, so as to project in front of the machine instead of at the rear.

I claim—

1. A mowing-machine comprising two cutter-bars adjacent to each other, the opposed faces provided with grooves and projecting ribs.

2. A mowing-machine comprising two cutter-bars adjacent to each other, the opposed faces provided with grooves and projecting ribs which fit one into the other and which run longitudinally along the cutter-bars so that they may be moved longitudinally in relation to each other, each cutter-bar provided with a set of teeth which press each other when the bars are moved relatively.

3. A mowing-machine comprising a reciprocating cutter-bar, means for driving said bar, the cutter-bar provided on one face with a series of longitudinal grooves, a series of teeth at one edge thereof, the grooves coming to the edge of the teeth and forming serrated edges for said teeth.

4. A mowing-machine comprising one or more driving-wheels, a frame upon which said driving-wheels are mounted, two sickle-bars in front of said driving-wheels mounted side by side, the engaging faces of said cutter-bars having projecting ribs or parts which run longitudinally therealong, the ribs of one cutter-bar fitting into grooves on the other, and means for connecting said bars with the driving wheel or wheels so that they will be moved relatively when the machine is moved forward.

5. A mowing-machine comprising one or more driving-wheels, a frame upon which said driving-wheels are mounted, two sickle-bars in front of said driving-wheels mounted side by side, the engaging faces of said cutter-bars having projecting ribs or parts which run longitudinally therealong, the ribs of one cutter-bar fitting into grooves on the other, and means for connecting said bars with the driving wheel or wheels so that they will be moved relatively when the machine is moved forward, supports removably attached to the frame and which carry said cutter-bars.

WILLIAM S. COLWELL.

Witnesses:
ALEXANDER GRANT,
CHAS. W. MARSHALL.